United States Patent [19]
Freeman

[11] 3,792,878
[45] Feb. 19, 1974

[54] CONDUIT SECTIONS
[75] Inventor: Jerry H. Freeman, Mount Prospect, Ill.
[73] Assignee: Phone-Ducs, Inc., Chicago, Ill.
[22] Filed: Sept. 27, 1971
[21] Appl. No.: 183,884

[52] U.S. Cl................ 285/137 R, 174/95, 285/223, 285/364, 285/347, 285/423
[51] Int. Cl.............................................. F16l 39/00
[58] Field of Search............... 277/168, 170, DIG. 2; 285/137 R, 223, 230, 231, 233, 234, 364, 406, 110, 347, 379, 423; 138/115, 172; 174/95–97

[56] References Cited
UNITED STATES PATENTS
| | | | |
|---|---|---|---|
| 3,163,448 | 12/1964 | Franklin | 285/230 X |
| 2,126,505 | 8/1938 | Risser | 285/364 X |
| 2,882,073 | 4/1959 | James | 277/207 |
| 2,971,538 | 2/1961 | Brumbach | 138/111 |

FOREIGN PATENTS OR APPLICATIONS
1,199,020  6/1959  France................. 138/172

*Primary Examiner*—Dave W. Arola
*Attorney, Agent, or Firm*—Wallenstein, Spangenberg, Hattis and Strampel

[57] ABSTRACT

Conduit sections are connected and sealed together and buried beneath the earth's surface to provide a sealed underground conduit for housing cables or the like therein. The conduit sections are of molded high impact plastic, the sealed joints between the conduit sections include tapered male and female portions on the ends of the sections and annular resilient gaskets therebetween, and the sections are secured together by spring clips.

10 Claims, 11 Drawing Figures

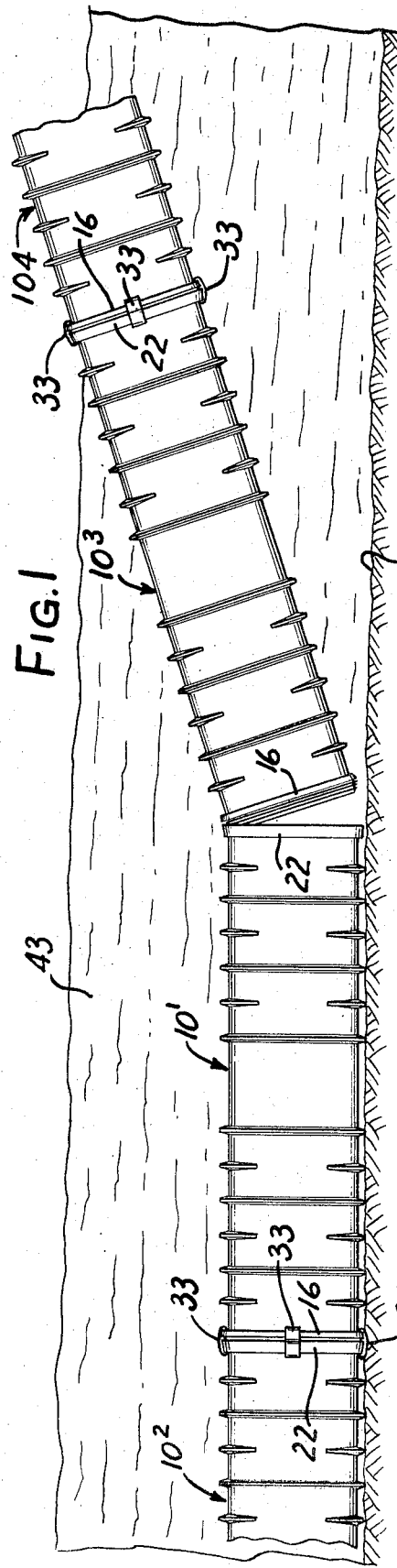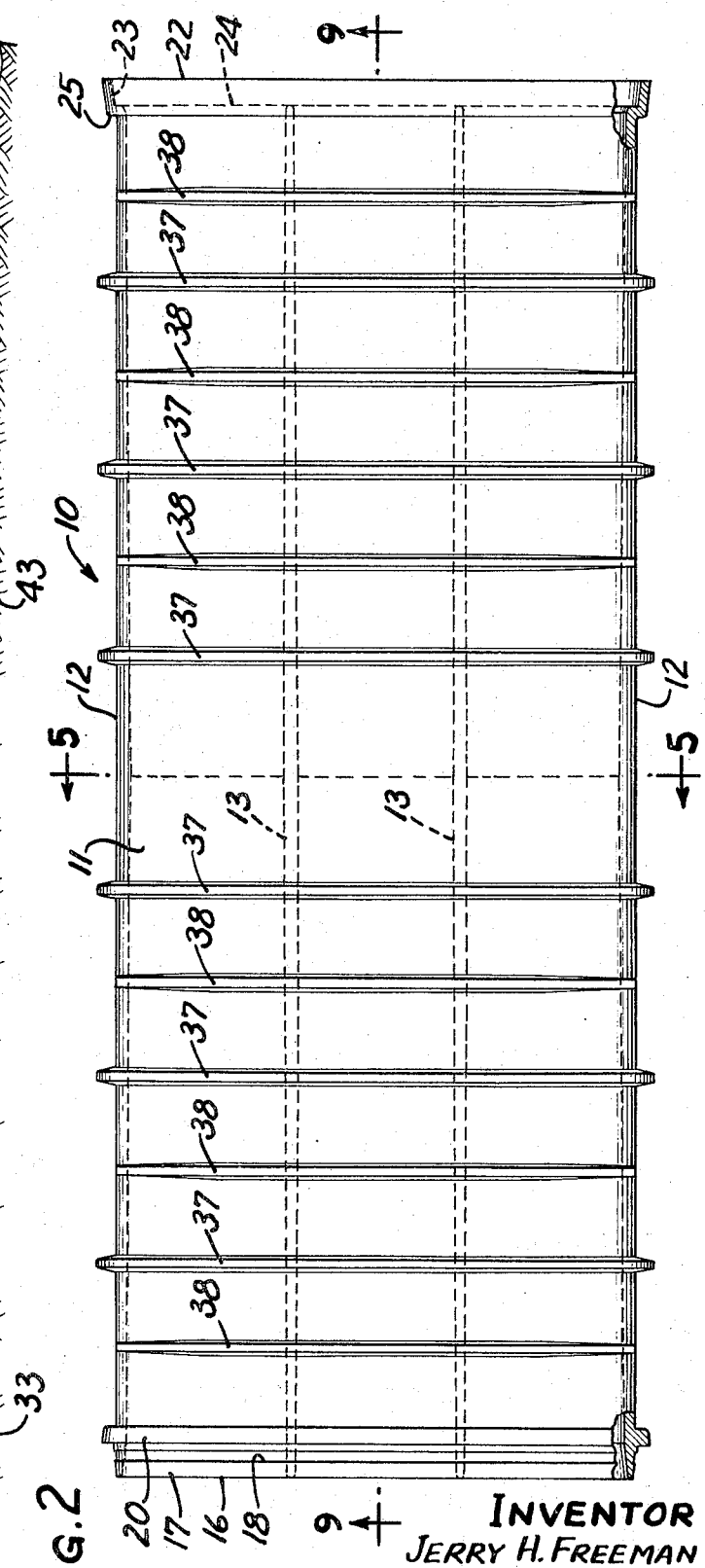

PATENTED FEB 19 1974 3,792,878

INVENTOR
JERRY H. FREEMAN by: Wallenstein, Spangenberg,
Hattis & Strampel ATTYS.

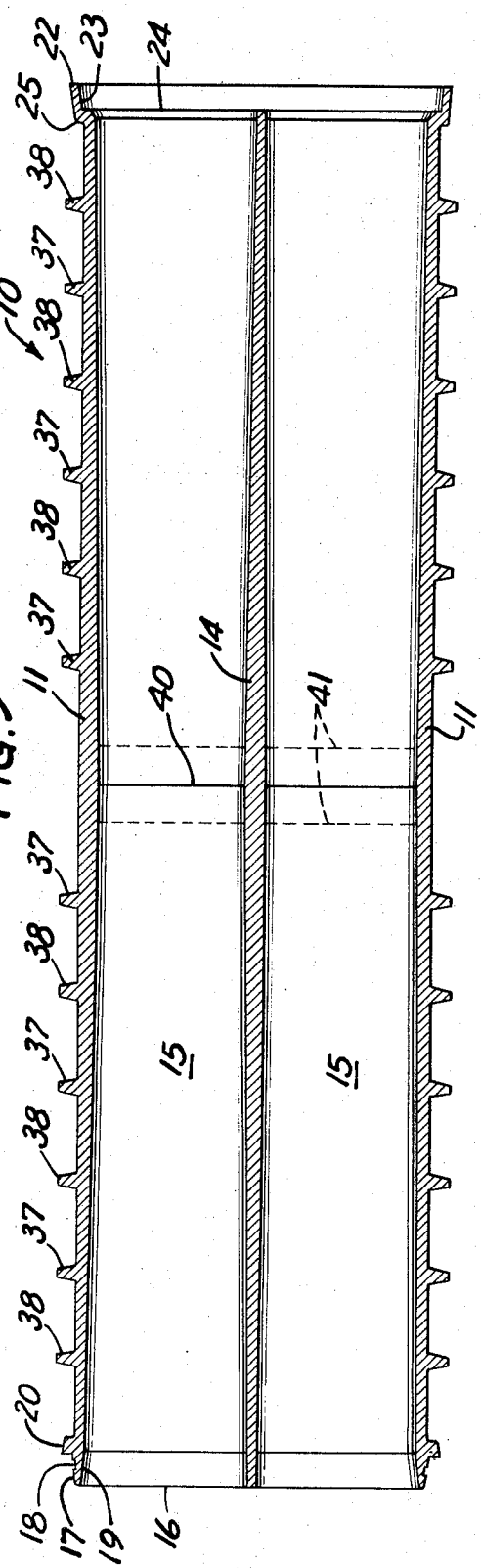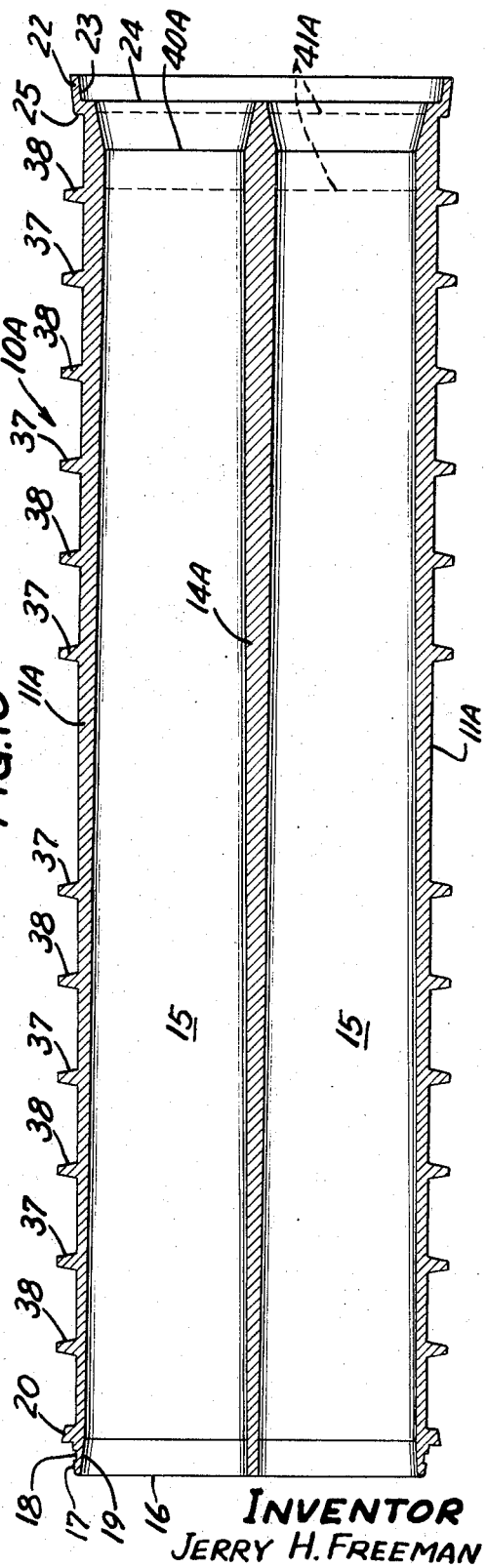

CONDUIT SECTIONS

This application is related to my U. S. Pat. No. 3,545,493, granted Dec. 8, 1970, and is directed to improvements thereover.

As in my prior patent, this application is directed to conduit sections for connection to similar conduit sections to provide a sealed underground conduit of desired length for housing cables or the like therein.

The principal object of this invention is to provide improved conduit sections which are inexpensive to manufacture, which are light in weight so that they may be readily handled and manipulated, which are rugged and strong and corrosion resistant so that they are admirably suitable for use as underground conduit systems, which have efficient sealing joints between the sections so as to effectively exclude water and moisture from seeping therein, which provide for limited angular displacement with respect to each other so that the conduit system comprising said conduit sections may follow contours of the ground in which they are embedded, which may be readily connected together on location in a simple and time-saving manner so as to provide for inexpensive assembly thereof into an underground conduit system, and which are internally provided with guide surfaces which facilitate stringing of the cable or the like therethrough.

Briefly, in accordance with this invention, each conduit section comprises longitudinally extending enclosing walls forming a passage therethrough, an outwardly tapered male portion at one end of the section, and an outwardly flared female portion at the other end of the section having internal transverse dimensions which are greater than the external transverse dimensions of the outwardly tapered male portion. The outwardly tapered male portion of each section is receivable in the outwardly flared female portion of an adjacent similar section and the outwardly flared female portion of each section receives the outwardly tapered male portion of an adjacent similar section with clearance between the male and female portions of the sections. An annular resilient sealing gasket is carried by the outwardly tapered male portion of each section with its inside face engaging and sealing the outwardly tapered male portion and with its outside face engaging the outwardly flared female portion of the adjacent section for sealing the same. The resilient sealing gasket is provided with ribs for increasing the sealing effect thereof.

The internal and external transverse dimensions of the male and female portions of the sections provide sufficient clearance therebetween to permit limited angular displacement of the sections and yet provide sealing of the sections by the resilient sealing gasket regardless of the limited angular misalignment. Thus, the sealed underground conduit formed by these conduit sections may follow the contour of the ground in which it is embedded.

The conduit sections are each provided with shoulder flanges adjacent the male and female ends thereof and spring clips engage these shoulder flanges for securing the sections together in sealed relation, the spring clips being hammered in place and providing a simple and efficient manner of assembling the conduit sections into the sealed underground conduit.

The conduit sections are each provided with longitudinally spaced transversely extending reinforcing ribs to aid in withstanding pressures and loads to which the sealed underground conduit may be subjected. Also, the conduit sections are each preferably provided with longitudinally extending partition walls for dividing the interior of the conduit into a plurality of longitudinally extending passages therethrough. The transverse dimensions between the partition walls and the enclosing walls at a position within the length of each section are less than those at the ends of the section and gradually increase from said position to the ends of the section to provide guide surfaces in the passages at said position which form the principal support for the cable or the like passing therethrough. Such guide surfaces may be substantially midway between the sections or near one end of the sections. The conduit sections are preferably of injection molded high impact plastic such as linear polyethylene or the like.

Further objects of this invention reside in the details of construction of and the cooperative relationships between the component parts of the conduit section of this invention.

Other objects and advantages of this invention will become apparent to those skilled in the art upon reference to the accompanying specification, claims and drawings in which:

FIG. 1 is a diagrammatic view illustrating the conduit sections of this invention being installed in a trench or the like for providing a sealed underground conduit for housing cables or the like;

FIG. 2 is a top plan view of one of the conduit sections;

FIG. 9 is a vertical sectional view through the conduit section taken substantially along the line 9—9 of FIG. 2; and FIG. 10 is a vertical sectional view similar to that of FIG. 9 but illustrating a modified form of the conduit section.

Figure 3:
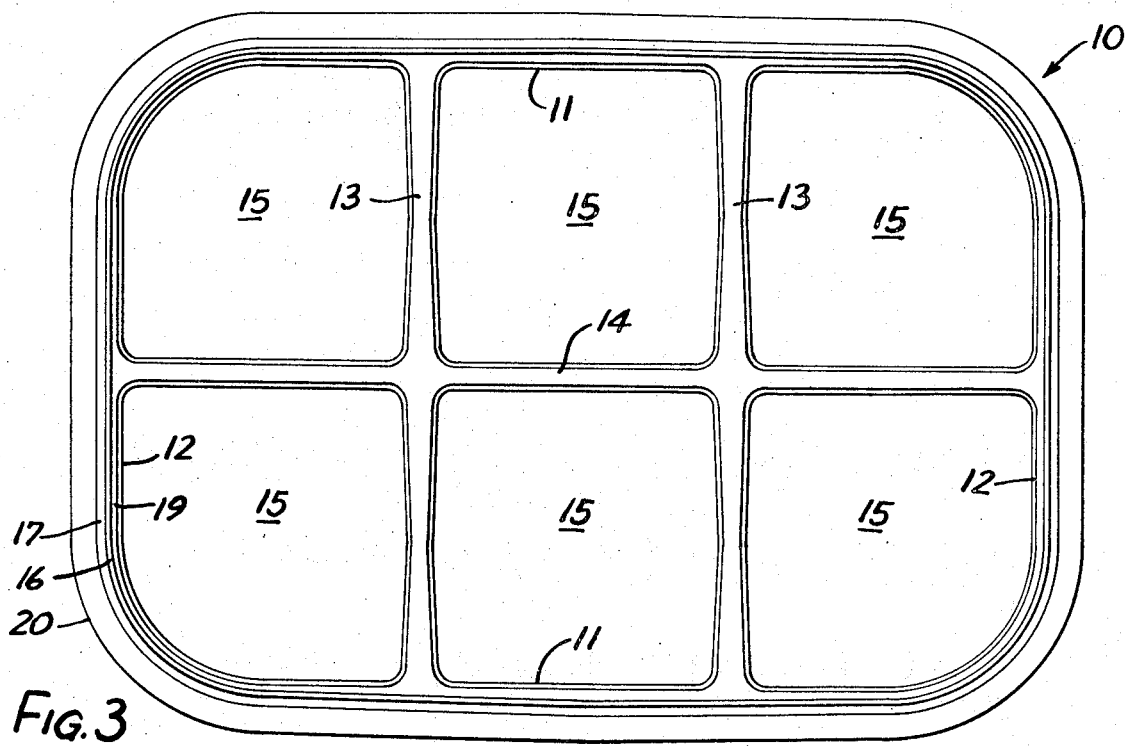
FIG. 3 is an end view of the conduit section illustrating the male end thereof and looking from the left of FIG. 2.
Figure 4:
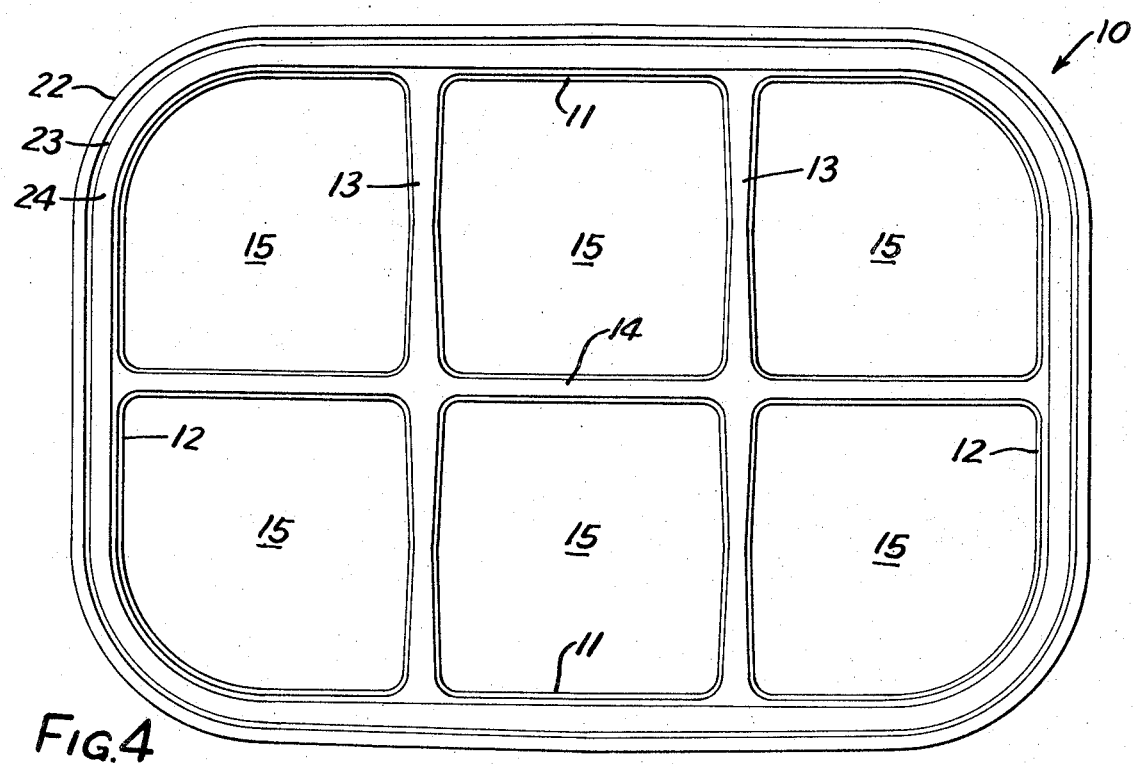
FIG. 4 is an end view of the conduit section illustrating the female end thereof and looking from the right of FIG. 2.
Figure 5:
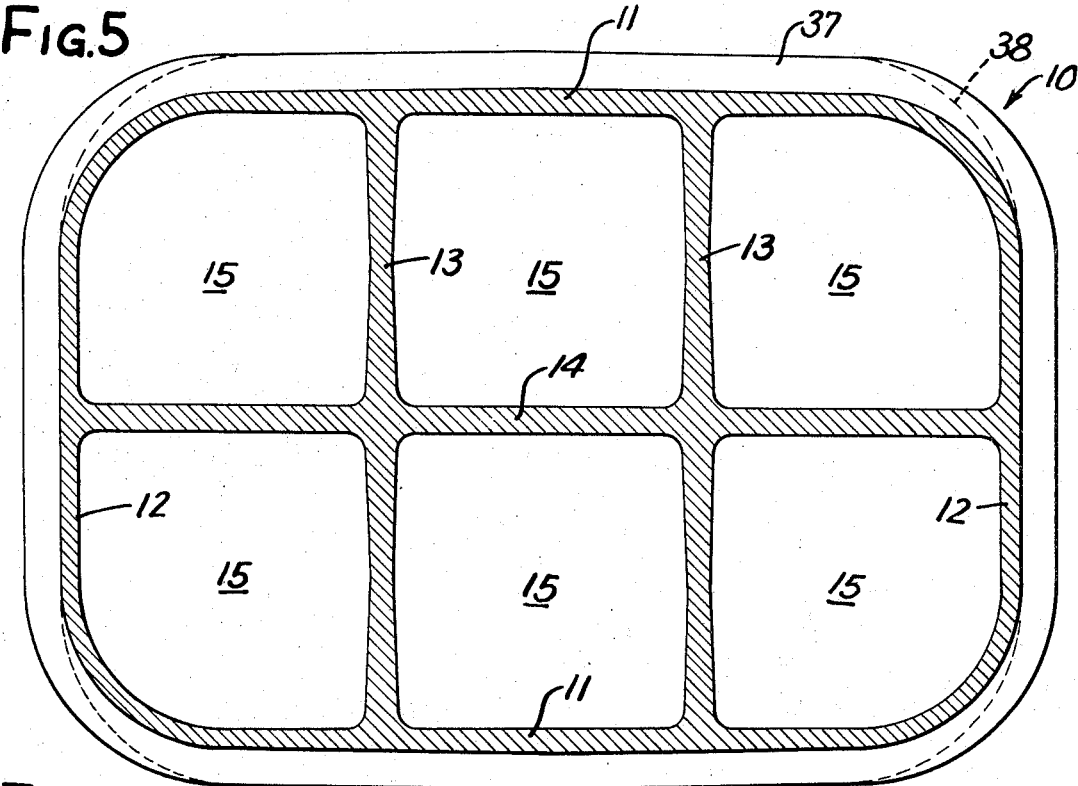
FIG. 5 is a vertical sectional view through the conduit section taken substantially along the line 5—5 of FIG. 2.

Referring first to FIGS. 2 to 9, one form of the conduit section of this invention is generally designated at 10. It includes enclosing walls for forming a passage or passages through the conduit section, such as the top and bottom enclosing walls 11 and side enclosing walls 12. The conduit section is preferably provided with vertically arranged partition walls 13 and horizontally arranged partition walls 14 for dividing the interior of the conduit section into a plurality of longitudinally extending passages 15.

One end of the conduit section 10 is provided with a male portion 16. The outer surface of the male portion 16 is outwardly tapered as indicated at 17 and this outwardly tapered surface 17 is provided with a continuous groove 18. The inner surface of the male portion 16 may be outwardly flared as indicated at 19. The conduit section 10 is provided with a shouldered flange 20 adjacent the male portion 16 thereof.

The other end of the conduit section 10 is provided with a female portion 22 whose inner surface is flared outwardly as indicated at 23. The female end 22 of the conduit section is provided with a surface 24 which is adapted to limit the insertion of the male portion of an adjacent conduit section. The conduit section 10 is also provided with a shoulder flange 25 adjacent the female end thereof.

An annular resilient sealing gasket 28 formed of neoprene rubber or the like is carried by the outwardly tapered male portion 16 of the conduit section 10. The inside surface of this resilient sealing gasket 28 is provided with a continuous rib 29 which is received in the groove 18 for securing the gasket 28 upon the outwardly tapered male portion 16 of the conduit section. This rib 19 also operates to increase the effectiveness of the seal between the resilient gasket 28 and the outwardly tapered male portion 16 of the conduit section. The outside surface of the sealing gasket 28 is provided with a plurality of longitudinally spaced continuous ribs 30 which are adapted to engage and be deformed by the outwardly flared female surface 23 of the female portion 22 of an adjacent conduit section so as to increase the sealing effect between the resilient gasket 28 and the female portion 22 of an adjacent conduit section.

Figure 6:
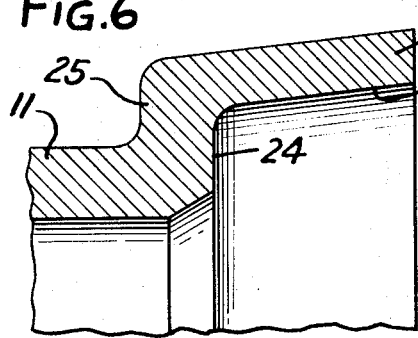
FIG. 6 is an enlarged partial sectional view of the female end of the conduit section.
Figure 7:
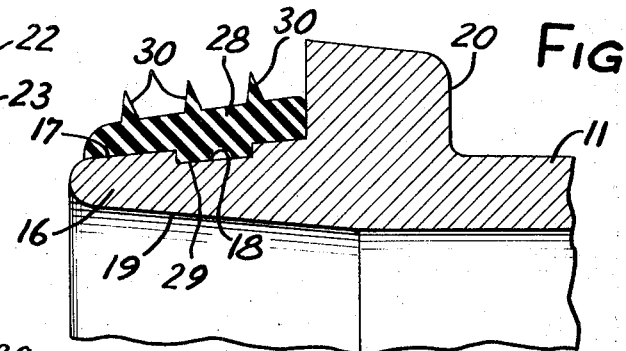
FIG. 7 is an enlarged partial sectional view of the male end of the conduit section and illustrating the sealing gasket applied thereto.
Figure 8:
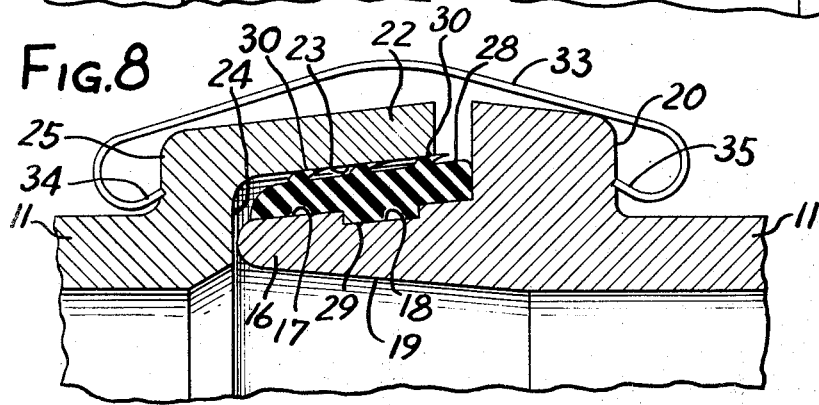
FIG. 8 is an enlarged partial sectional view of the joint between adjacent conduit sections illustrating the same secured together by the spring clip.

The male portion of one conduit section as illustrated in FIG. 7 is received in the female portion of an adjacent similar conduit section as illustrated in FIG. 6 to form the sealed joint between the two sections as illustrated in FIG. 8. In FIG. 8 it is noted that the ribs 30 on the sealing gasket 28 are deformed to increase the sealing effect. The transverse dimensions of the female portion 22 of one conduit section is greater than the transverse dimensions of the male portion 16 of the other conduit section so as to accommodate the sealing gasket 28 therebetween. These transverse dimensions of the female and male portions of the conduit sections are such as to provide a limited amount of angular displacement between the adjacent conduit sections so that the various conduit sections in forming the underground conduit may follow the contour of the ground in which the conduit is embedded.

Figure 8A:
FIG. 8A is an elevational view of the spring clip for securing the conduit sections together.

The assembled male and female sections of the conduit sections as illustrated in FIG. 8 are held in assembled relation by spring clips 33, the spring clips 33 being illustrated in FIG. 8A. Each spring clip 33 includes an elongated bent portion which spans the sealed joint between adjacent conduit sections and it is reversely bent at each end as indicated at 34 and 35. These reversely bent portions 34 and 35 of the spring clip engage the shoulder flanges 20 and 25 of the adjacent conduit sections to hold the same in assembled relation. The spring clips 33 are applied by hammering the same in place over the sealed joint between the conduit sections with the reverse bends 34 and 35 engaging the shoulder flanges 20 and 25. The resiliency of the spring clips 33 allow the application of the spring clips to the sealed joints by hammering or the like and also maintain the reverse bend portions 34 and 35 thereof in solid resilient contact with the shouldered flanges 20 and 25. Due to the reverse bends 34 and 35 in the spring clips 33 and the resilient force applied by the spring clips 33, the spring clips are firmly held in place and operate efficiently to maintain the sealed conduit sections together. They also allow for a limited amount of angular misalignment of the conduit sections but still maintain the seal between the male and female portions of the adjacent conduit sections.

The exterior of the enclosing walls 11 and 12 of the conduit section are provided with longitudinally spaced apart transversely arranged reinforcing ribs 37 and 38. As illustrated in the drawings, the reinforcing ribs 37 extend completely around the enclosing walls 11 and 12 while the reinforcing ribs 38 extend only along the upper and lower enclosing walls 11. These reinforcing ribs 37 and 38 reinforce the enclosing walls to prevent collapsing or deformation of the walls due to pressures and loads to which the walls may be subjected when inserted in a trench and back filled.

The conduit section of this invention is molded from a high impact plastic such as linear polyethylene or the like so as to provide maximum strength and maximum resistence to corrosion but yet still be of light weight. The conduit sections may be injection molded by means of a four part mold. The two external mold parts provide the outer surfaces of the conduit sections and may have a parting line along the section line 9—9 of FIG. 2. The two internal parts of the mold operate to form the internal surfaces of the conduit sections including the male and female ends thereof, the internal mold parts having a parting line substantially along the line 40 as illustrated in FIG. 9. When the four part mold is closed, the high impact plastic is injected therein to form the conduit section. After the conduit section is so formed, the internal two parts of the mold are separated and withdrawn and then the two outer parts of the mold are separated to release the conduit section.

The transverse dimensions of the internal passages in the conduit section at the parting line 40 for the internal die parts are less than the transverse dimensions of the passages adjacent the ends thereof and these transverse dimensions gradually increase from the position 40 to the ends of the conduit section. Thus, the transverse dimensions of the passages adjacent the position 40 provide guide surfaces thereat and on each side thereof as indicated at 41 in FIG. 9 which form the main support for the cables or the like which are strung through the conduit section and which assist in guiding the stringing of the cables or the like past the sealed joints between the sections.

Referring now to FIG. 10, a modified arrangement of the conduit section of this invention is illustrated at 10A. Here, like parts have been identified by like reference characters. The essential difference between the conduit section of FIG. 10 with respect to that of FIG. 9 lies in the location of the position of the minimum transverse dimensions in the passages in the conduit section. In FIG. 10 the position of the minimum transverse dimensions is located at 40A, the location being near one end of the conduit section as distinguished from being substantially midway between the ends of the conduit section. The die structure for molding the conduit section of FIG. 10 is essentially the same as that for molding the conduit section of FIG. 9 except that one of the inner retractable die sections is considerably longer than the other. Here, also, the transverse dimensions of the passages increase gradually from the position 40A of minimum transverse dimension to the ends of the conduit section. This minimum transverse dimension 40A and the areas on each side thereof as indicated at 41A provide a guide surface for the cables or the like strung through the conduit section which supports the cables or the like strung through the passages and which facilitates the strengthening of the cables through the conduit sections without interference by the sealed joints between the sections.

Referring now to FIG. 1, there is shown the manner of embedding the conduit of this invention in a trench 43 in the ground. The left hand portion of FIG. 1 shows conduit sections $10^1$ and $10^2$ assembled in the trench and secured together by the spring clips 33. The right hand side of FIG. 1 shows several conduit sections $10^3$ and $10^4$ secured together by the spring clips 33 and being placed in position before sealing the joint between the conduit section $10^1$ and $10^3$. When the joint between the section $10^1$ and $10^3$ is completed, this joint is held in assembled relation by spring clips suitably hammered in place. Due to the light weight of the conduit sections and the strength of the joints held together by the spring clips 33, it is possible to secure together up to four or five conduit sections before such subassmebly is lowered into the trench 43. Thus, it is possible to subassemble a number of conduit sections before dropping the subassembly into the trench 43 and, hence, it is only necessary to apply spring clips to certain of the sections in the trench as distinguished from applying them separately to each section as it is dropped into the trench. Considerable savings in the installation of the underground conduit are thus obtained.

While for purposes of illustration two forms of this invention have been disclosed, other forms thereof may become apparent to those skilled in the art upon reference to this disclosure and, therefore, this invention is to be limited only by the scope of the appended claims.

I claim:

1. A conduit section for connection to similar conduit sections to provide a sealed underground conduit of desired length for housing cables or the like therein, said section being an injection molded plastic section of light weight and high strength and comprising longitudinally extending partition and enclosing walls forming a plurality of longitudinally extending passages therethrough, an outwardly tapered male portion at one end of the section, and an outwardly flared female portion at the other end of the section with internal transverse dimensions which are greater than the external transverse dimensions of the outwardly tapered male portion, the outwardly tapered male portion at said one end of the section being receivable in the outwardly flared female portion of an adjacent similar section and the outwardly flared female portion at said other end of the section receiving the outwardly tapered male portion of an adjacent similar section with clearance between the respective outwardly tapered and flared male and female portions of the sections, an annular resilient sealing gasket carried by the outwardly tapered male portion of said section having its inside face engaging and sealing said outwardly tapered male portion and its outside face engageable with the outwardly flared female portion of the adjacent section for sealing the same, said outwardly tapered male portion of the section having a groove therearound, and the inside face of the resilient sealing gasket having a continuous rib spaced intermediate its width and received in said groove with the inside face of the resilient gasket on each side of the continuous rib engaging the outwardly tapered male portion of the section on each side of said groove for locating the gasket on said male portion and increasing the sealing effect therebetween, and fastening means for securing and holding together the adjacent sections in sealed relation.

2. A conduit section as defined in claim 1 wherein the internal transverse dimensions of the outwardly flared female portion and the external transverse dimensions of the outwardly tapered male portion provide sufficient clearance therebetween and the fastening means are such to permit limited angular misalignment of the sections and yet sealing of the secured sections by the resilient sealing gasket regardless of the limited angular misalignment.

3. A conduit section as defined in claim 1 wherein the outside face of the resilient sealing gasket has a plurality of longitudinally spaced apart continuous ribs for engaging the outwardly flared female portion of an adjacent section to be deformed thereby for increasing the sealing effect therebetween.

4. A conduit section as defined in claim 1 wherein the fastening means comprises a first shoulder flange adjacent the male portion and a second shoulder flange adjacent the female portion of said section, and spring clips engageable with the first shoulder flange of said section and the second shoulder flange of an adjacent section and with the second shoulder flange of said section and the first shoulder flange of an adjacent section for securing the sections together in sealed relation.

5. A conduit section as defined in claim 4 wherein said spring clips comprise an elongated bent portion for spanning the sealed joints between the sections and reversely bent end portions for gripping the shoulder flanges of the sections when hammered into place.

6. A conduit section as defined in claim 1 wherein the outer faces of the longitudinally extending enclosing walls are provided with a plurality of longitudinally spaced projections.

7. A conduit section as defined in claim 6 wherein said plurality of longitudinally spaced projections comprise transversely extending ribs.

8. A conduit section for connection to similar conduit sections to provide a sealed underground conduit of desired length for housing cables or the like therein, said section being an injection molded plastic section of light weight and high strength and comprising longitudinally extending partition and enclosing walls forming a plurality of longitudinally extending passages therethrough, an outwardly tapered male portion at one end of the section, and an outwardly flared female portion at the other end of the section with internal transverse dimensions which are greater than the external transverse dimensions of the outwardly tapered male portion, the outwardly tapered male portion at said one end of the section being receivable in the outwardly flared female portion of an adjacent similar section and the outwardly flared female portion at said other end of the section receiving the outwardly tapered male portion of an adjacent similar section with clearance between the male and female portions of the sections, an annular resilient sealing gasket carried by the outwardly tapered male portion of said section having its inside face engaging and sealing said outwardly tapered male portion and its outside face engageable with the outwardly flared female portion of the adjacent section for sealing the same, and fastening means for securing together the adjacent sections in sealed relation, the transverse dimensions between the partition and enclosing walls at a position within the length of said section being less than those at the ends of said section and gradually increasing from said position to the ends of the section to provide a guide surface in the passage at said position which forms the principal support for the cable or the like passing therethrough.

9. A conduit section as defined in claim 8 wherein said position is substantially midway between the ends of said section.

10. A conduit section as defined in claim 8 wherein said position is near one end of said section.

* * * * *